United States Patent [19]
Wilson et al.

[11] Patent Number: 4,471,785
[45] Date of Patent: Sep. 18, 1984

[54] ULTRASONIC IMAGING SYSTEM WITH CORRECTION FOR VELOCITY INHOMOGENEITY AND MULTIPATH INTERFERENCE USING AN ULTRASONIC IMAGING ARRAY

[75] Inventors: David A. Wilson; James L. Buxton, both of Palo Alto; Philip S. Green, Atherton; Donald J. Burch, Los Altos; John F. Holzemer, Menlo Park; S. David Ramsey, Jr., Palo Alto, all of Calif.

[73] Assignee: SRI International, Menlo Park, Calif.

[21] Appl. No.: 427,735

[22] Filed: Sep. 29, 1982

[51] Int. Cl.³ .................. G01N 29/04; G01N 9/24; G06G 7/12
[52] U.S. Cl. .................................. 128/660; 364/821; 73/602; 73/631
[58] Field of Search .................. 128/660, 663; 73/631, 73/625, 626; 367/98, 100, 119, 121, 124, 153, 154; 364/821, 820

[56] References Cited
U.S. PATENT DOCUMENTS

| | | | |
|---|---|---|---|
| 3,561,430 | 2/1971 | Filler | 128/661 |
| 4,317,369 | 3/1982 | Johnson | 73/607 |
| 4,395,909 | 8/1983 | Steinberg | 73/602 |

*Primary Examiner*—Kyle L. Howell
*Assistant Examiner*—Deidre A. Foley
*Attorney, Agent, or Firm*—Edward B. Gregg; Willis E. Higgins; Urban H. Faubion

[57] ABSTRACT

An ultrasonic imaging system (50) has an array (52) of transducer elements (54-1 through 54-21) for receiving ultrasonic signals reflected from within an inhomogeneous object (16) being examined. The system (50) has a means (80, 84, 88, 94) connected to generate an image in response to the ultrasonic signals. A cross-correlator (70) is connected to compare the signals received by the transducer elements (54-1 through 54-21). An output addressing circuit (130) is connected to inhibit or otherwise modify gain of selected ones of the signals based on the comparison to reduce multipath ultrasonic wave interference, refraction or obstruction image distortion or degradation. A preferred ultrasonic imaging array (52) for this purpose and for time delay image distortion correction has a plurality of segmented, annular transducer elements (54-2 through 54-21). The elements (54-2 through 54-21) are formed as sectors of circles with substantially equal arc lengths. A digital signal processing circuit for the system (50) has a plurality of dual port RAMs (66-1 through 66-21) as delay lines and a cross-correlator (70) including an output addressing circuit (130) controlled by a microcomputer (128). The output addressing circuit (130) generates addresses for output of information from the dual port RAM delay lines (66-1 through 66-21) to accomplish time delay correction and elimination or other gain modification of ultrasonic signals with multipath interference, refraction or obstruction.

15 Claims, 7 Drawing Figures

ULTRASONIC IMAGING SYSTEM WITH CORRECTION FOR VELOCITY INHOMOGENEITY AND MULTIPATH INTERFERENCE USING AN ULTRASONIC IMAGING ARRAY

CROSS-REFERENCE TO RELATED APPLICATIONS

This application, a concurrently filed, commonly assigned application by Philip S. Green, James F. Havlice and John F. Holzemer entitled "Ultrasonic Imaging System with Refraction Compensation" Ser. No. 06/427,694, filed Sept. 29, 1982 and a concurrently filed, commonly assigned application by James L. Buxton entitled "Variable Delay Memory System" Ser. No. 06/427,693, filed Sept. 29, 1982 are directed to related inventions.

BACKGROUND OF THE INVENTION

1. Field of the Invention

This invention relates to an improved ultrasonic imaging apparatus in which image interference due to ultrasonic signal refraction and bending is corrected. It further relates to an improved ultrasonic imaging array design for use with such a system or a system which compensates for time delay errors in ultrasonic signals arising from ultrasonic velocity inhomogeneities in objects being examined, in accordance with the teaching of the above referenced related applications. The invention further relates to such a system incorporating digital electronics which allow image correction and enhancement on a realtime basis.

2. Description of the Prior Art

The use of ultrasonic sound waves in apparatus for the examination of solid objects is now a well known and comparatively well developed art. In such apparatus an array of one or more ultrasonic transducer elements is used to transmit ultrasonic waves into the object, and reflections of the waves from within the object are used to define geometry and related characteristics of the object's interior. Such ultrasonic imaging apparatus has been found to be particularly useful in medical applications as a non-invasive diagnostic tool. The state of the art in such medical applications has been reviewed, for example, by Havlice and Taenzer, "Medical Ultrasonic Imaging," Proceedings of the IEEE, Volume 67, No. 4, Apr. 19, 1979, pages 620 to 641.

The use of a segmented, annular transducer array for ultrasonic imaging apparatus is disclosed in U.S. Pat. No. 4,270,546, for characterizing a preferred direction of fibrous tissue inside a biological structure, but with no suggestion of utilizing such an array structure to compensate for time delay errors.

Proposals have been made in the prior art to utilize digital electronics in ultrasonic imaging apparatus. For example, Waag, R. C., P. P. K. Lee and R. Gramiak, "Digital Processing to Enhance Features of Ultrasound Images," Proc. Ultrasound Symp., IEEE CH 1120-55U, pages 163–167, J. DeKlerk and B. R. MacAvoy, eds. (1976); and Corl P.D., P. M. Grant and J. S. Kino, "A Digital Synthetic Focus Acoustic Image System for NDE," Proc. 1978 IEEE Ultrasound Symp., pages 263–268 (1978), both disclose the use of such electronics in such systems. However, the systems disclosed there are not suitable for realtime correction of time delay errors resulting from inhomogeneities in tissue or other objects being analyzed, nor for the correction of images distorted due to multipath interference of ultrasonic waves generated by the apparatus.

Recognition of the image distortion problems addressed by this invention is contained in Savatius, A. D. et al, "Ultrasonic Beam Distortions Introduced by Rib Cage in Cardiac Investigations," Proc. 26th Ann. Mtg. Amer. Inst. of Ultrasound in Medicine and 10th Ann. Mtg., Soc. of Diagnostic Medical Sonographers, p. 72 (1981), but with no suggestion of correcting for such image distortion.

Thus, while the art of ultrasonic imaging is a well developed one, there remains a further need for such an apparatus which will correct image distortion due to multipath interference, refraction and obstruction of the ultrasonic waves, and for an improved array design for such systems incorporating time delay error correction and ultrasonic wave image distortion or degradation correction.

SUMMARY OF THE INVENTION

Accordingly, it is an object of this invention to provide an ultrasonic imaging apparatus which corrects for multipath interference, refraction, and obstruction in reflected ultrasonic signals.

It is another object of the invention to provide an ultrasonic imaging array having a configuration especially adapted for use of time delay compensation and correction of image distortion or degradation arising from multipath ultrasonic wave interference produced from inhomogeneities, from refraction and from obstruction in objects being examined.

It is still another object of the invention to provide an ultrasonic imaging system incorporating digital electronics which will allow such time delay compensation and multipath interference, refraction and obstruction image distortion or degradation correction on a realtime basis.

The attainment of these and related objects may be achieved through use of the novel ultrasonic imaging apparatus, ultrasonic imaging array, and digital electronics for such apparatus herein disclosed. An ultrasonic imaging system in accordance with the invention includes an array of transducer elements for receiving ultrasonic signals reflected from within an object being examined. The system has a means connected to generate an image in response to the ultrasonic signals. A means is connected to compare the signals received by the transducer elements. A means is connected to modify the gain of, and preferably inhibit, selected ones of the signals based on the comparison to correct multipath ultrasonic wave interference, refraction or obstruction image distortion or degradation. In a preferred form of the system, the signal comparison is made by means of a cross-correlation among the signals, with any signals having a cross-correlation substantially different than the cross-correlations of the other signals being inhibited or having their gain modified on the basis of the cross-correlation. Such signal inhibition is also referred to herein as "apodization." As used herein the phrase "gain modification" embraces the total elimination or apodization.

The present invention as described above can be used with "linear array" and "phased array" systems to correct problems in the plane of the electronic focusing. The invention can be used with any multiple element array that is electronically focused. However, a preferred form of an ultrasonic imaging array for practicing the invention has a plurality of segmented, annular transducer elements. The elements are formed as sectors of circles. The sectors each have substantially equal arc lengths. In practice, such an array design will allow optimum time delay compensation for inhomogeneities and correction of multipath interference, refraction and obstruction distortion or degradation.

A signal processing circuit for the ultrasonic imaging system in accordance with this invention, which will allow an improved digital electronics implementation of the time delay compensation and the adaptive gain modification to correct multipath interference, refraction and obstruction distortion or degradation has a delay memory means with, for each transducer element of a transducer element array in the system, a separate input and output. The inputs are connected to receive information signals representing ultrasonic signals sensed by each element of the array. A buffer memory for each element of the array is also connected to receive the information signals representing ultrasonic signals sensed by each element of the array. A correlation determining means is connected to receive stored information based on the information signals from the buffer memories for at least two of the elements of the array, in order to determine a correlation between the ultrasonic signals for the at least two elements of the array. A control means is connected between the correlation determining means and the delay memory means. The control means controls presentation of information outputs from the delay memory means based on the correlation. The control means compensates for time delay distortion caused by different times of receipt of the ultrasonic signals by the transducer elements in the array by causing the delay means to present the information outputs corresponding to the non-simultaneous ultrasonic signals substantially in phase with respect to one another. The control means may also modify the gain (including the apodization) of selected ones of the information outputs for which the correlation determined by the correlation determining means varies by more than a predetermined amount from the correlation for other ones of the information outputs, in order to correct for multipath interference, refraction or obstruction of those ultrasonic signals. In a preferred form, the correlation determining means is a microcomputer and the control means is an address generator for the delay memory means. Use of such a signal processing circuit allows the time delay distortion correction and the multipath interference refraction or obstruction correction to be carried out on a realtime basis in an ultrasonic imaging system.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1A:
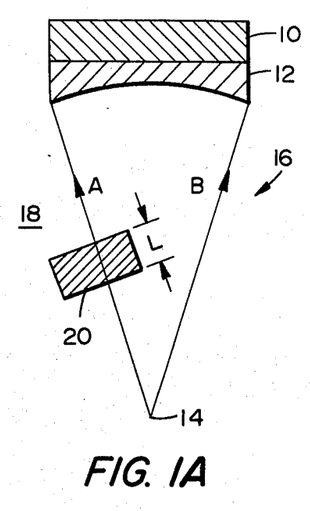
FIGS. 1A and 1B are side views of a transducer array of the invention in use.

Turning now to the drawings, more particularly to FIG. 1A, there is shown an ultrasonic transducer element array 10 as used in the invention and a lens 12 for focusing ultrasonic signals from the transducer element array 10 to a focal point 14. Although the lens 12 may be made of transparent plastic, it should be recognized that such focusing can be accomplished with a curved transducer or solely electronically as well. As shown in FIG. 1A, when used to examine tissue, ultrasonic signals from transducer array 10 are transmitted into tissue 16 and are reflected from focal point 14 along path A, which passes through muscle 18 and fat region 20. Path B is entirely through muscle 18.

As is known in the art, the velocity of such ultrasonic signals through various tissues varies significantly. Table 1 shows typical published velocities for various types of tissue. As can be seen from the table, the velocities for blood and muscle are similar, while the velocity in fat is 6-10% less.

TABLE I

| Tissue | Velocity (m/s) |
|---|---|
| Fat | 1410–1479 |
| Water (20° C.) | 1483 |
| Blood | 1571 |
| Muscle | 1576–1603 |
| Cartilage | 1665 |
| Tendon | 1750 |

It thus can be seen that the block of fat 20 surrounded by muscle 18 will produce a time delay difference between paths A and B of $$\Delta T = L \left( \frac{1}{V_{fat}} - \frac{1}{V_{muscle}} \right),$$

where L is the path length in the fat 20. For example, 5mm of fat 20 (which would only be 10% of the path length for a 5 cm deep artery) will cause a delay error of 0.32 microseconds, using average velocity values for fat and muscle. This represents a phase shift of more than 360° at a signal frequency of 4 MHz, and will result in severe defocusing of the ultrasonic beam. As explained in the above referenced Green, Havlice and Holzemer application, variable lengths of delay lines can be used to correct image distortion produced by such time delay differences. As explained more fully below, this invention is directed in part to improvements in ultrasonic imaging systems which incorporate such time delay difference distortion correction.

Figure 1B:
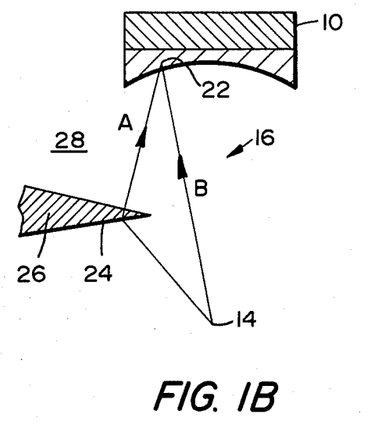

FIG. 1B shows a somewhat related problem when ultrasonic signals are transmitted from ultrasonic transducer element array 10, reflected from point 14 and sensed by the element array 10. As shown, reflected ultrasonic signals emanating from focal point 14 in tissue can follow different paths A and B to arrive at the same point 22 at the transducer array 10 as a result of refraction or ray bending at interface 24 between fat region 26 and muscle tissue 28. These different paths A and B introduce a distorted echo wave shape. This phenomenon is common with electromagnetic wave transmission, leading to "ghosts" in television reception, multipath distortion in FM radio reception, and large signal-strength variations in time in shortwave reception. Similar effects are observed if the transmitted signal is simply refracted to one side of the transducer array or obstructed altogether, such as by a bone.

Depending on the particular distribution of tissue, the distortion will vary over the array 10, with some of the transducer elements affected strongly and some almost not at all. Computer modeling of ultrasonic array responses shows that even one misplaced signal can cause a substantial increase in the side lobe level, and hence more "acoustic clutter" in the images. The degradation in side lobe response may be severe, even though the lateral resolution is almost unaffected.

Although it is not possible to remove the multipath distortion, refraction or obstruction in an individual signal channel, it has been discovered that the effect on the image can be reduced by modifying the gain of that signal, including disconnecting that channel, in accordance with the present invention. Specifically, when the cross-correlations are obtained for adaptive focusing, channels corresponding to a particularly low cross-correlation are gain modified and may be disconnected altogether. The gain of each such channel is thus modified depending on its signal strength or cross-correlation.

Figure 2:
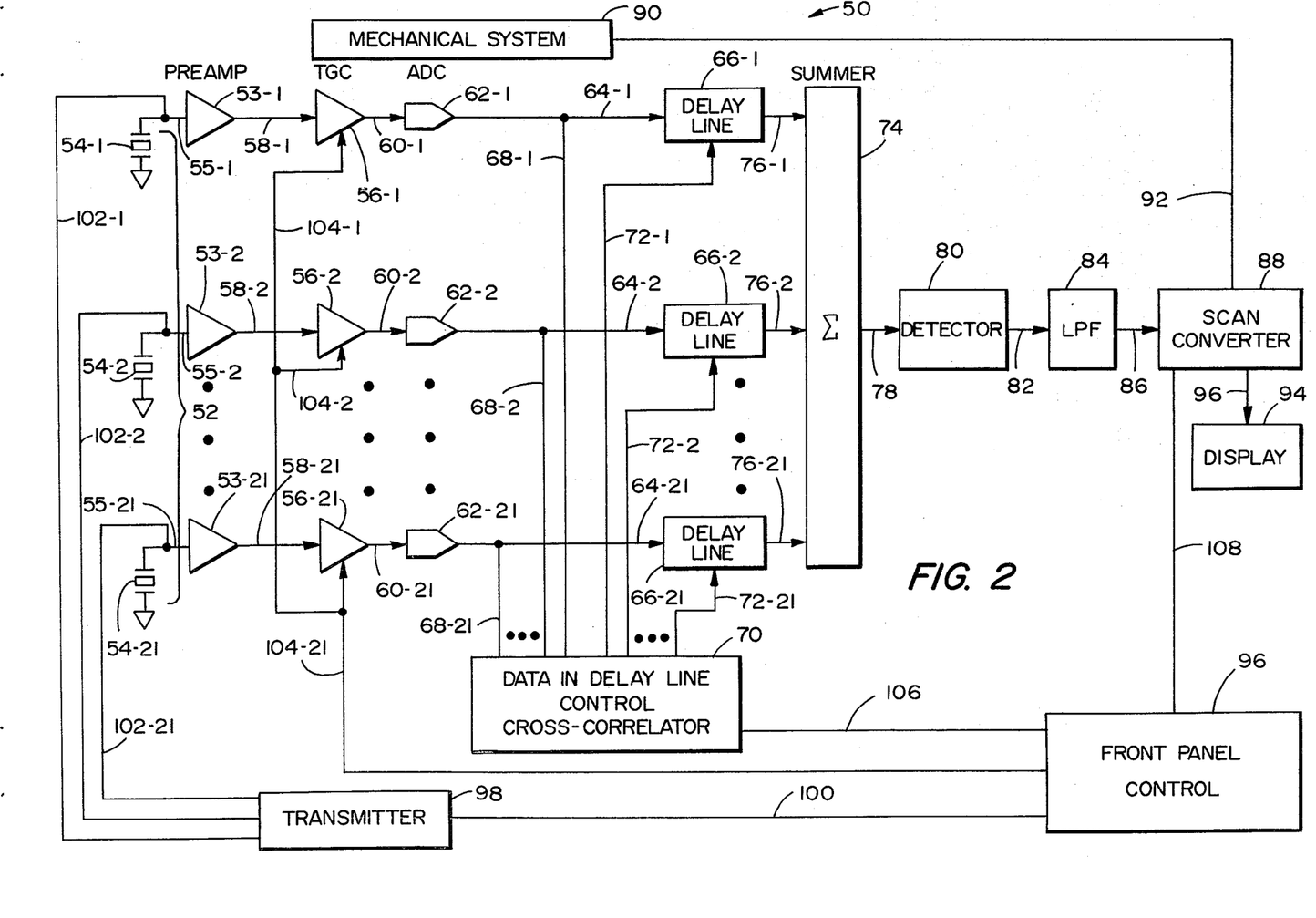
FIG. 2 is a block diagram of processing circuitry of a system in accordance with the invention.

Turning now to FIG. 2, there is shown a mechanically scanned sector scan ultrasonic imaging apparatus 50 in accordance with the invention. The apparatus 50 includes an array 52 of ultrasonic transducers 54-1 through 54-21. The transducer elements 54-1 through 54-21 are each connected to a preamplifier 53-1 through 53-21 by lines 55-1 through 55-21. The outputs of preamplifiers 53-1 through 53-21 are each connected to a time gain controlled amplifier 56-1 through 56-21 by lines 58-1 through 58-21. Amplifiers 56-1 through 56-21 have their output connected by lines 60-1 through 60-21 to analog/digital (A/D) converters 62-1 through 62-21. The A/D converters 62-1 through 64-21 have their outputs connected by lines 64-1 through 64-21 to delay lines 66-1 through 66-21. The outputs of A/D converters 62-1 through 62-21 are also connected by lines 68-1 through 68-21 to a cross-correlation processor 70. The correlation processor 70 is also connected by lines 72-1 through 72-21 to the delay lines 66-1 through 66-21. The delay lines 66-1 through 66-21 are connected to a summing circuit 74 by lines 76-1 through 76-21. Output line 78 from summing circuit 74 is connected to a detector circuit 80. Output line 82 from the detector circuit 80 is connected to a low pass filter (LPF) circuit 84. Output line 86 from the LPF circuit 84 is connected to scan converter circuit 88. A mechanical scanning system 90 of a known type, which oscillates the transducer array 52 to produce the sector scan, is also connected to the scan converter circuit 88 by line 92. The scan converter circuit 88 converts angular coordinates of the mechanical scan produced by the mechanical system 90 to XY coordinates for display 94, which is connected to the scan converter circuit 88 by line 96. Display 94 is of the conventional raster scan type.

Front panel controls 96 are connected to ultrasonic transmitters 98 by line 100. The ultrasonic transmitters 98 are respectively connected to the transducer elements 54-1 through 54-21 by lines 102-1 through 102-21. The front panel controls 96 are also connected to the time gain controlled amplifiers 56-1 through 56-21 by lines 104-1 through 104-21. In addition, the front panel controls 96 are connected to the correlation processor 70 by line 106 and to the scan converter circuit 88 by line 108.

As will be explained more fully below, the delay lines 66-1 through 66-21 are preferably implemented as dual port random access memories. The cross-correlation circuit 70 is preferably implemented with buffer memories and a microcomputer, with the microcomputer utilizing the cross-correlation data to generate addresses on lines 72-1 through 72-21 for the simultaneous release of signal information from the delay lines 66-1 through 66-21 to the summing circuit 74 to implement the correction of time delay image distortion. In order to correct multi-path interference, the microcomputer of the cross-correlation circuit 70 omits the address for a signal to be eliminated on the control lines 72-1 through 72-21. In an alternative embodiment of the invention, the cross-correlation circuit 70 could supply appropriate signals on selected ones of the lines 72-1 through 72-21 to attenuators (not shown) included in the delay lines 66-1 through 66-21 to modify the gain of their output signals, rather than eliminating such signals.

In operation of the system shown in FIG. 2, ultrasonic signals supplied by transmitter 50 are transmitted by transducer elements 54-1 through 54-21 into tissue or another object to be examined by the apparatus. These signals are reflected from within the tissue or other object being examined back toward the transducers 54-1 through 54-21. As a result of inhomogeneities within the tissue or other object, the reflected signals received at the transducers 54-1 through 54-21 are delayed for one or more of the transducers relative to the signals received at the other transducers, and multipath interference, refraction or obstruction produces signal distortion at one or more of the transducers 54-1 through 54-21. The signals supplied on lines 58-1 through 58-21 are therefore not in phase relative to one another. The amplified signals are supplied on lines 60-1 through 60-21 to the A/D converters 62-1 through 62-21 and converted to digital form. The resulting digitized signals are supplied to the delay lines 66-1 through 66-21 and to the cross-correlation processor 70 by lines 64-1 through 64-21 and 68-1 through 68-21. As a result of the cross-correlation calculations, addresses for the signals to be supplied by delay lines 66-1 through 66-21 in phase with one another on lines 76-1 through 76-21 are supplied at the same time on lines 72-1 through 72-21 to the delay lines 66-1 through 66-21. As a result, variations in arrival of the input signals on lines 64-1 to delay lines 66-1 through 66-21 resulting from time delays in the reflected ultrasonic signals are eliminated. For any signals having unusually low correlations, which indicate a multipath interference, the address for that signal is omitted, thus reducing the effect of the multipath interference. The in phase information signals on lines 76-1 through 76-21 are added in summing circuit 74 and supplied through detector circuit 80 and LPF circuit 84 to scan converter circuit 88. Scan converter circuit 88 utilizes the sector scanning information supplied by mechanical system 90 on line 92 and the summed simultaneous signals to generate an ultrasonic image on display 94.

Figure 3:
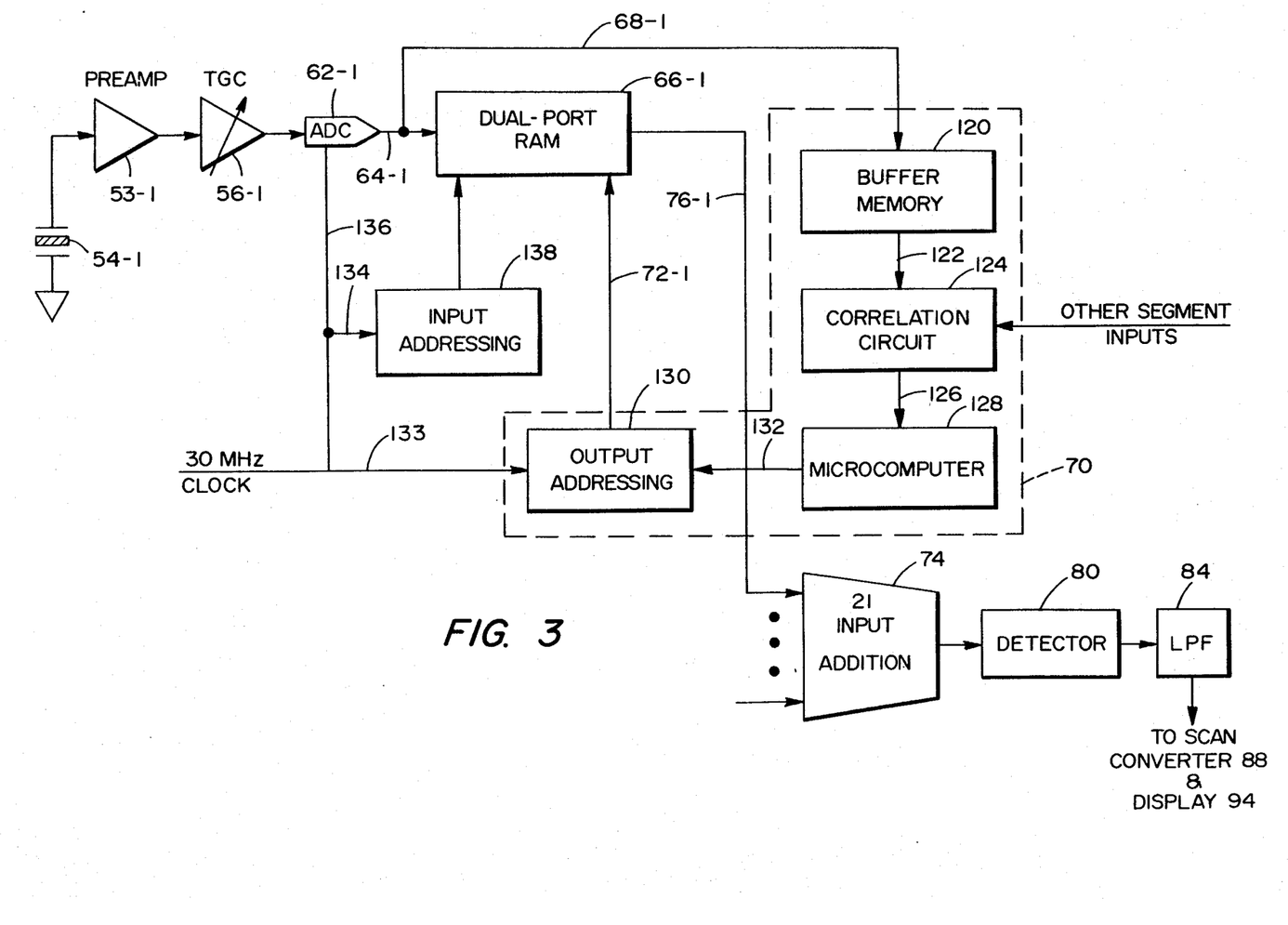
FIG. 3 is a more detailed block diagram of the processing circuitry of the system shown in FIG. 2.

FIG. 3 shows further details of the cross-correlation circuit 70. The associated electronics for a single channel of the ultrasonic imaging system of FIG. 2 are also shown in somewhat more detail. The transducer segment 54-1, preamplifier 53-1, time gain controlled amplifier 56-1 and A/D converter 62-1 are interconnected as in FIG. 2. Delay line 66-1 is shown implemented as a dual port RAM, receiving the input of A/D converter 62-1 on line 64-1 and supplying an output on line 76-1 to summing circuit 74. The output of A/D converter 62-1 is also supplied on line 68-1 to buffer memory 120 in the correlation processor 70. The buffer memory 120 supplies its output on line 122 to a correlation circuit 124. The correlation circuit 124 may be implemented with commercially available multiplier/accumulator circuits. In addition to the output of buffer memory 120, the correlation circuit 124 receives inputs from corresponding buffer memories connected to receive signals obtained from other transducer segments. The cross-correlations of these inputs are calculated by the correlation circuit 124 and downloaded on line 126 to microcomputer 128. Microcomputer 128 finds the peak value of each correlation function and updates the initial value table of output addressing circuits 130 on line 132. In turn, the output addressing circuits 130 provide the address signals on line 72-1, used to control output from the delay line 66-1 on line 76-1. Lines 132, 134 and 136 provide a 30 MHz system clock input to the output addressing circuits 130, the input addressing circuits 138 and the A/D converter 62-1, respectively. The summing circuit 74 provides its output to detector circuit 80 and low pass filter 84 as in FIG. 2.

In practice, small delay step sizes are ideally utilized to satisfy the high resolution delay requirements for adaptive focusing. However, small step size implies very high speed data conversion, which requires very expensive hardware. A sampling rate of 30 MHz provides a delay increment of 33 ns, or about 1/7 wavelength at the 4.0 MHz center frequency of the transducers 54-1 through 54-21 (FIG. 2). This sampling rate can be achieved with commercially available single chip A/D converters 62-1 through 62-21, and therefore, offers a reasonable compromise between cost and delay.

As pointed out above in connection with FIG. 3, the actual time delay of the sample data takes place in the dual port RAM delay line 66-1 and the corresponding delay lines 66-2 through 66-21 (FIG. 2) for the other channels of the system. This dual port RAM has the capabilities to receive or write data and output or read different data samples during each 33 ns sample period. This simultaneous read and write capability allows new data samples to be entered into the delay line memory 66-1 sequentially at the fixed 30 MHz sample rate, while the output data samples are selected at varying offsets from the current input address location, in order to accomplish the adaptive focusing of this invention. The number of samples the output data is offset from the input data represents the relative time delay at that instant for that particular transducer segment. The offset or delay for each depth in the image is determined by the output addressing circuits 130. The output addressing circuits could be implemented with a stored look-up table containing the offset address for each sample. Since there are 4,000 samples in 10 cm of images, the look-up table would require considerable memory. The use of input addressing circuits 138 and a smaller look-up table in the output addressing circuits 130 is a lower cost, more flexible approach. Since the time delay is a smoothly varying function, the next output address will vary from the previous address by 0, 1 or 2 locations at each point in the delay/depth function. This means that only two bits of stored information are required for each sample period, regardless of the length of the time delay RAM 66-1. The length of the dual port RAM delay line 66-1 needs only to be as long as the number of samples needed for the maximum delay, for example, 64 samples for 2.1 microseconds of relative delay.

Each transducer segment 54-1 through 54-21 has its own stored output addressing table in output addressing circuits 130 to produce the required delay/depth pattern to focus the array 52 dynamically in homogeneous tissue. Variations in path delay to each segment 54-1 through 54-21, due to inhomogeneous tissue, are adaptively compensated by a further variation of the delays in accordance with the outputs of the correlation circuit 124 described above. The correlation circuit 124 provides an additional initial value to correct the delay in the region of interest, in order to correct for time delay distortion of the image.

Figure 4:
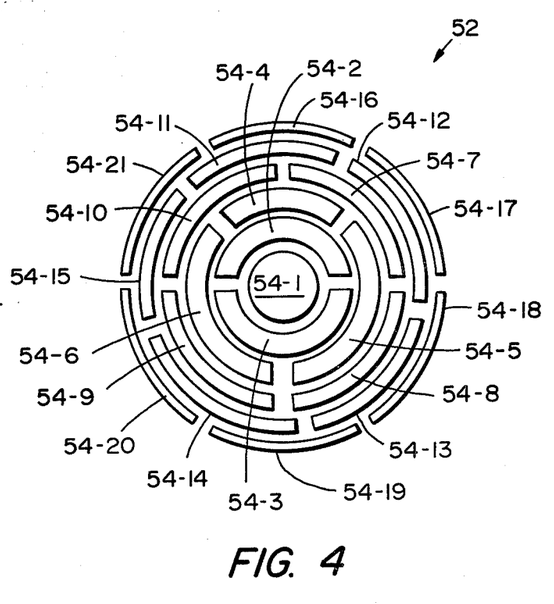
FIG. 4 is a plan view of the transducer array in the system shown in FIGS. 1-3.

While the system and circuit aspects of this invention can be utilized with essentially any array of ultrasonic transducer elements, use of the configuration for array 52 shown in FIG. 4 is especially preferred. In the array 52, the transducer element 54-1 is an undivided central disc. Elements 54-2 and 54-3 are formed from a first ring divided in half, the next ring comprising the elements 54-4 through 54-6 is divided into thirds, and so forth, with the outermost ring being divided into six segments 54-16 through 54-21. The 21 elements are therefore provided with approximately equal arc length along the average radius of each element 54-1 through 54-21.

Figure 5:
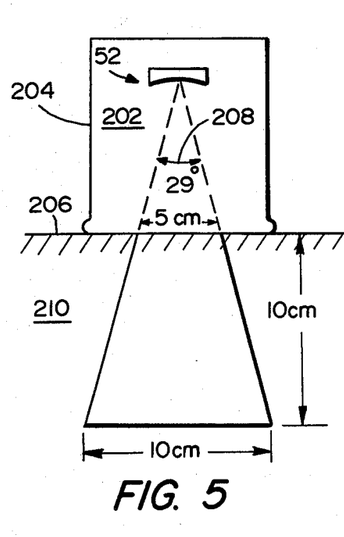
FIG. 5 is a side view of a transducer and application housing of the invention shown in FIGS. 1-4.

FIG. 5 shows a preferred arrangement for an ultrasonic imaging system including the ultrasonic array 52 of FIG. 4 to provide a system especially adapted for imaging deep abdominal arteries. The transducer array 52 is mounted in a body of water 202 contained within a coupling boot 204. In use, the coupling boot 204 is positioned against a patient's skin 206. With a mechanical oscillation through a scan angle 208 of 29°, a field of vision for transducer 52 of 5 cm at skin surface 206 and 10 cm at a depth of 10 cm within the tissue 210 is provided.

Figure 6:
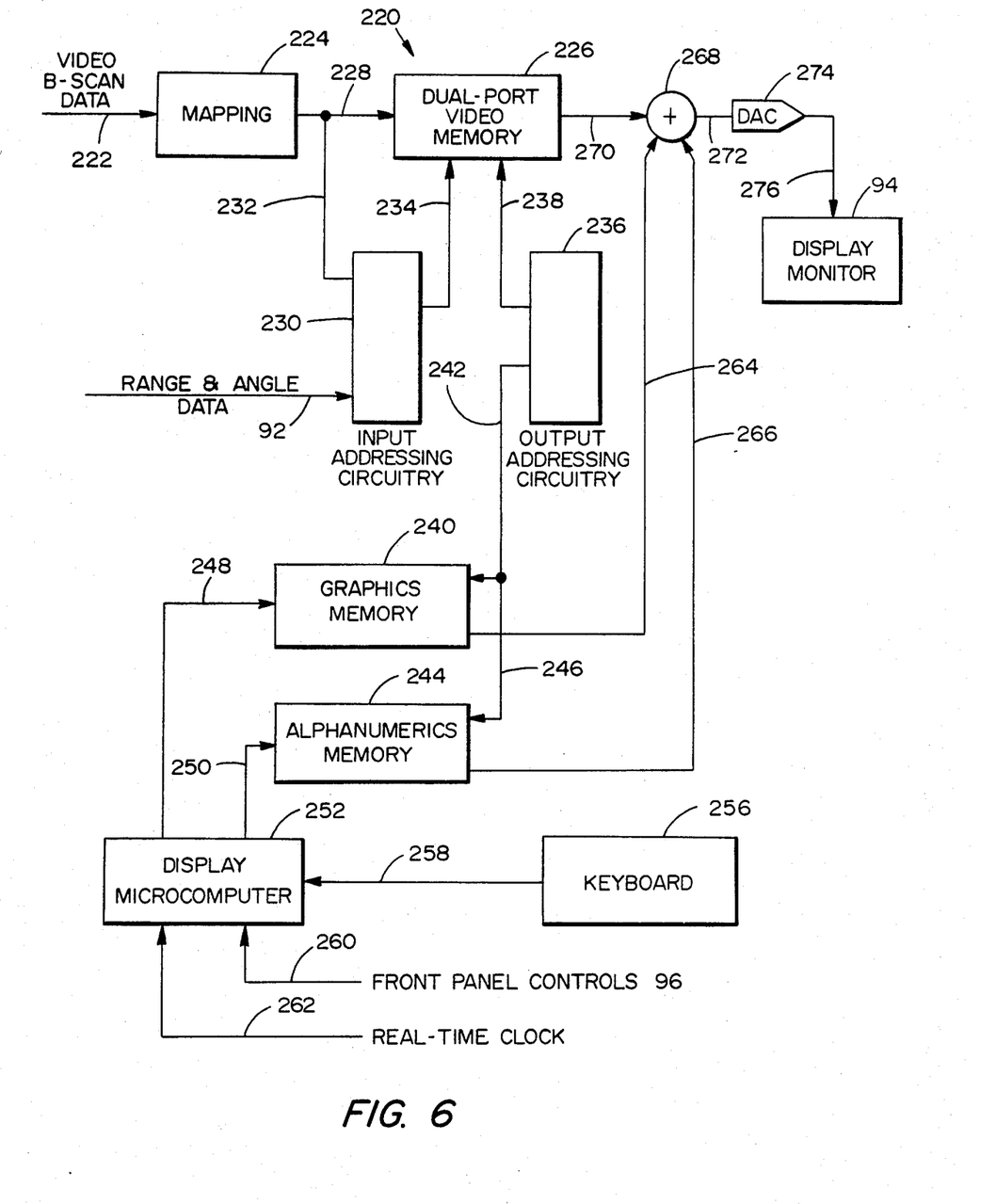
FIG. 6 is a more detailed block diagram of the processing circuitry of the system shown in FIGS. 2 and 3.

FIG. 6 is a block diagram of display sub-system 220 for converting angular coordinate ultrasonic image data supplied by the LPF circuit 84 (FIGS. 2 and 3) and for superimposing other graphics information on the ultrasonic image. The incoming video signal at 222 is first compressed to increase the amount of ultrasonic information displayed in the limited dynamic range of the display monitor 94. The compression is accomplished in mapping means 224, using one of several user selectable non-linear mappings contained in look-up tables. Compressing the incoming video data also reduces the number of bits per pixel of memory in video memory 226 required to store the image. The mapping means 224 is connected to the dual port video memory 226 by line 228. The mapping means is also connected to input addressing circuitry 230 by line 232. The input addressing circuitry also receives range and angle information on line 92 from the mechanical scanning system 90 (FIG. 2). The input addressing circuitry 230 supplies addresses of the location in the video memory 226 where the video information is to be stored on line 234 to the video memory 226. Output addressing circuitry 236 is connected to the video memory 226 by line 238, to graphics memory 240 by line 242 and to alphanumerics memory 244 by line 246. The graphics memory 240 and alphanumerics memory 244 are connected by lines 248 and 250 to display microcomputer 252. The display microcomputer 252 is connected to keyboard 256 by line 258, to front panel controls 96 by line 260 and to a realtime clock by line 262. The graphics memory 240, alphanumerics memory 244 and display microcomputer 252 provide suitable signals on lines 264 and 266 to summing circuit 268 for combination with the video information on line 270 from the ultrasonic imaging so that the ultrasonic results, other graphics and alphanumeric representations can be shown together on display monitor 94. The output of summing circuit 268 is provided on line 272 to a digital/analog (D/A) converter 274. The output of D/A converter 274 is supplied on line 276 to the display monitor 94.

The digital scan converter 220 reformats the ultrasonic scanning information into a raster TV format, and a microcomputer controlled graphics and alphanumeric overlay to display calibration markings, grey scale bars and patient data on the display 94 along with the ultrasonic image. The microcomputer 252 will also provide a realtime display of the date, time and scale markings. Keyboard 256 interfaced to the microcomputer 252 allows the operator to enter patient and image orientation information.

It should now be readily apparent to those skilled in the art that an ultrasonic imaging system, ultrasonic imaging array and digital signal processing circuits capable of achieving the stated objects of the invention have been provided. This system corrects for multipath interference, refraction or obstruction in reflected ultrasonic signals. The ultrasonic imaging array is especially adapted for use in correcting time delay distortion of images arising from inhomogeneities in tissue or other inhomogeneous objects being examined. The signal processing circuits provide such corrections on a real-time basis.

It should be further apparent to those skilled in the art that various changes in form and details of the invention as shown and described may be made. It is intended that such changes be included within the spirit and scope of the claims appended hereto.

What is claimed is:

1. An ultrasonic imaging system comprising an array of transducer elements for receiving ultrasonic signals reflected from within an object being examined, means connected to generate an image in response to the ultrasonic signals, means connected to compare the signals received by the transducer elements by means of a cross-correlation among the signals, and means connected to modify amplitude of selected ones of the signals based on the comparison to correct image distortion, said signal modifying means being connected between said transducer elements and said image generating means.

2. The ultrasonic imaging system of claim 1 in which each of said transducer elements is connected to supply its ultrasonic signals to a delay means, and the cross-correlation signal comparison of said comparison means is further utilized to adjust the length of delay of at least one of said delay means so that the ultrasonic signals are supplied substantially in phase with respect to one another from said delay means.

3. The ultrasonic imaging system of claim 1 in which the selected ones of the signals are modified by apodizing the selected ones of the signals.

4. The ultrasonic imaging system of claim 1 in which the image distortion is from multipath ultrasonic signal interference, refraction of the ultrasonic signals away from the transducer elements, or obstruction of the ultrasonic signals.

5. An ultrasonic imaging system for an inhomogeneous medium comprising a segmented annular array of transducer elements for receiving ultrasonic signals reflected from within the inhomogeneous medium being examined, each of the annular segments being formed as sectors of circles, the sectors having substantially equal arc lengths, a plurality of signal delay means, one of said plurality of delay means being connected to receive the ultrasonic signals from a respective one of the transducer elements of said array, means also connected to receive the ultrasonic signals from each transducer element in said array for determining differences in delay for each signal from inhomogeneities within the medium and for adjusting a length of delay of at least one of said plurality of delay means based on the delay differences so that the ultrasonic signals are provided as substantially in phase outputs with respect to one another from each of said plurality of delay means.

6. The ultrasonic imaging system of claim 5 in which the transducer elements in said array are substantially isolated electrically and acoustically from one another, and said plurality of delay lines are connected to supply the output substantially in phase ultrasonic signals to a summing means.

7. The ultrasonic imaging system of claim 5 in which the differences in delay for each signal are determined through use of a plurality of cross-correlation values for each signal.

8. An ultrasonic imaging array comprising a plurality of segmented, annular transducer elements, said elements being formed as sectors of circles arranged in a plurality of concentric, circular rows, with the sectors of each circular row each having substantially equal arc lengths to the sectors of the remaining circular rows.

9. The ultrasonic imaging array of claim 8 additionally comprising a centrally disposed, undivided circular transducer element.

10. The ultrasonic imaging array of claim 8 in which said sector elements in successive rows overlap, so that said array is free of any straight line gap extending from a periphery to a center of said array.

11. A signal processing circuit for use with an ultrasonic imaging system, which system includes an array of transducer elements, which comprises a delay memory having for each transducer element, a separate input and output, the inputs being connected to receive information signals representing ultrasonic signals sensed by each element of the array, a separate buffer memory for each element of the array also connected to receive the information signals representing ultrasonic signals sensed by each element of the array, means connected to receive stored information based on the information signals from said buffer memories for at least two of the elements of the array and to determine a correlation between the ultrasonic signals for the at least two elements of the array, and control means connected between said correlation determining and said delay memory means to control presentation of information outputs from said delay memory means based on the correlation so that the information outputs are presented as substantially in phase representations of the ultrasonic signals.

12. The signal processing circuit of claim 11 in which said correlation determining means comprises a microcomputer and said control means comprises a means for supplying addresses to said delay memory means.

13. The signal processing circuit of claim 11 in which said delay memory means receives a plurality of the information signals at different times as a result of different times at which the ultrasonic signals are sensed by the elements of the array and said control means causes said delay memory means to present a corresponding plurality of the information outputs substantially in phase with respect to one another.

14. The signal processing circuit of claim 11 in which said control means causes said delay memory means to modify gain of selected ones of the plurality of information outputs for which the correlation of the corresponding stored information determined by said correlation determining means varies by more than a predetermined amount from the correlations for the corresponding stored information for other ones of said information outputs.

15. The signal processing circuit of claim 14 in which the gain of the selected ones of the plurality of information outputs is modified by eliminating the selected ones of the outputs.

* * * * *